United States Patent
Wagner et al.

(10) Patent No.: US 11,999,155 B2
(45) Date of Patent: Jun. 4, 2024

(54) SPUNBONDED LAMINATE

(71) Applicants: Tobias Wagner, Cologne (DE);
Sebastian Sommer, Troisdorf (DE);
Patrick Bohl, Hennef (DE)

(72) Inventors: Tobias Wagner, Cologne (DE);
Sebastian Sommer, Troisdorf (DE);
Patrick Bohl, Hennef (DE)

(73) Assignee: REIFENHAEUSER GMBH & CO. KG MASCHINENFABRIK, Troisdorf (DE)

(*) Notice: Subject to any disclaimer, the term of this patent is extended or adjusted under 35 U.S.C. 154(b) by 0 days.

(21) Appl. No.: 17/589,386

(22) Filed: Jan. 31, 2022

(65) Prior Publication Data
US 2022/0242090 A1     Aug. 4, 2022

(30) Foreign Application Priority Data
Feb. 1, 2021   (DE) .......................... 102021102287.8

(51) Int. Cl.
*B32B 5/26*     (2006.01)
*B32B 5/02*     (2006.01)
*B32B 37/10*    (2006.01)

(52) U.S. Cl.
CPC .............. *B32B 5/267* (2021.05); *B32B 5/022* (2013.01); *B32B 37/10* (2013.01); *B32B 2262/0253* (2013.01); *B32B 2262/124* (2021.05); *B32B 2262/16* (2021.05); *B32B 2307/718* (2013.01)

(58) Field of Classification Search
CPC ......... B32B 5/267; B32B 5/022; B32B 37/10; B32B 2262/0253; B32B 2262/124; B32B 2262/16; B32B 2307/718
See application file for complete search history.

(56) References Cited

U.S. PATENT DOCUMENTS

| | | | |
|---|---|---|---|
| 11,091,861 B2 | 8/2021 | Sommer | |
| 2005/0133948 A1* | 6/2005 | Cook | D01F 8/06 264/172.17 |
| 2009/0111347 A1* | 4/2009 | Peng | D01F 6/46 264/211 |
| 2015/0017864 A1* | 1/2015 | Schroer | D01F 8/06 442/361 |
| 2017/0335498 A1* | 11/2017 | Hansen | D04H 3/147 |

FOREIGN PATENT DOCUMENTS

JP         07197367 A  *  8/1995

OTHER PUBLICATIONS

Espacenet Translation of JP-07197367-A (Year: 2023).*

* cited by examiner

*Primary Examiner* — Michael Zhang
(74) *Attorney, Agent, or Firm* — Andrew Wilford

(57) ABSTRACT

A laminate has first and second spunbonded nonwoven layers at least one of which comprises or consists essentially of crimped continuous filaments that are bicomponent filaments having a first component based on polypropylene and a second component based on polypropylene. A specific density ρ (g/cm³) of the spunbonded nonwoven laminate depending on the surface density of the spunbonded nonwoven laminate lies below a density limit $\rho_G$ defined by the following equation:

$\rho_G = 9 \text{ cm}^{-1} \times \text{surface density g/cm}^2 + 0.0393 \text{ g/cm}^3$.

16 Claims, 2 Drawing Sheets

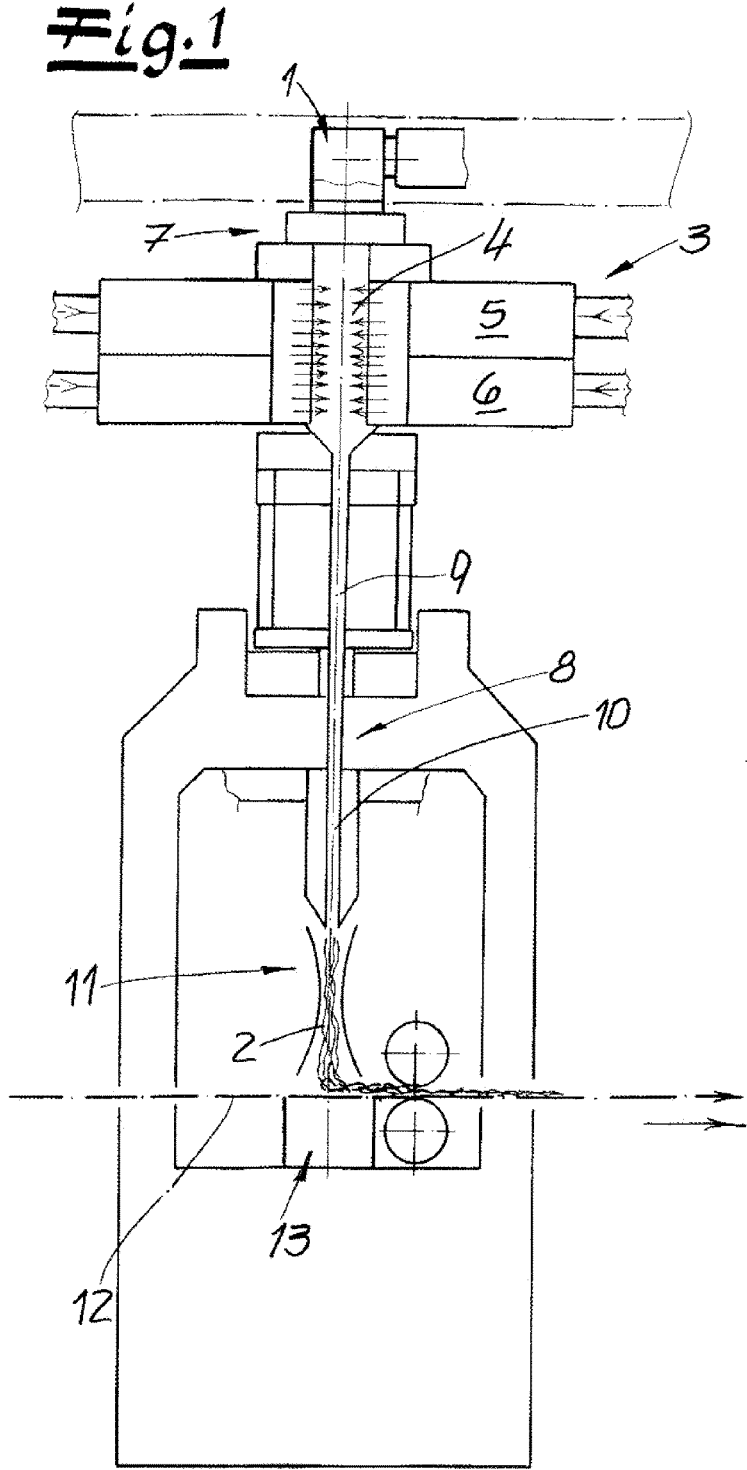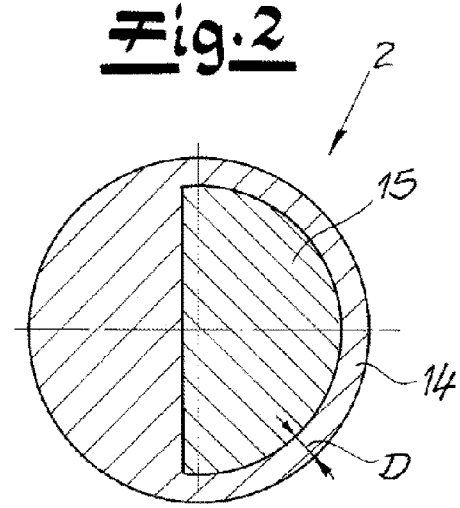

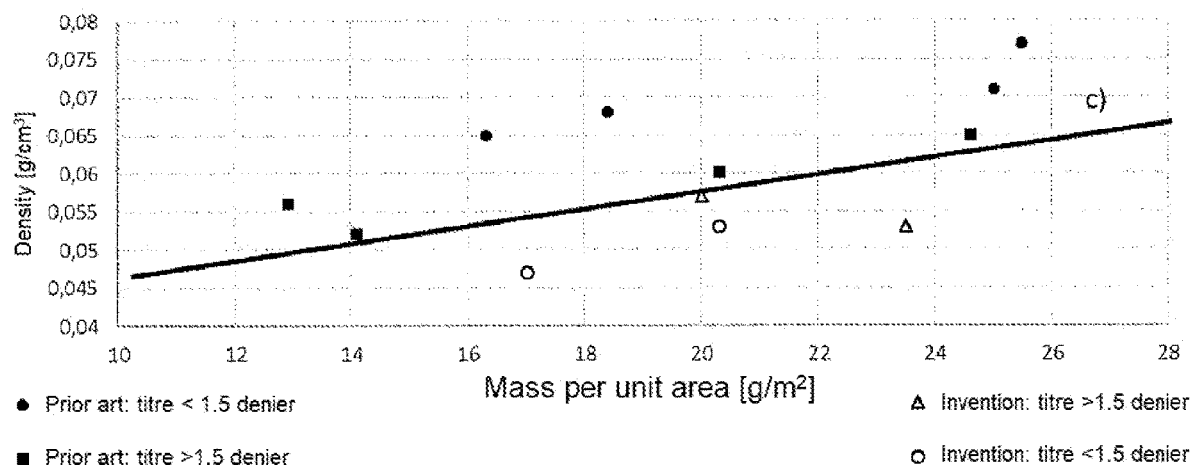
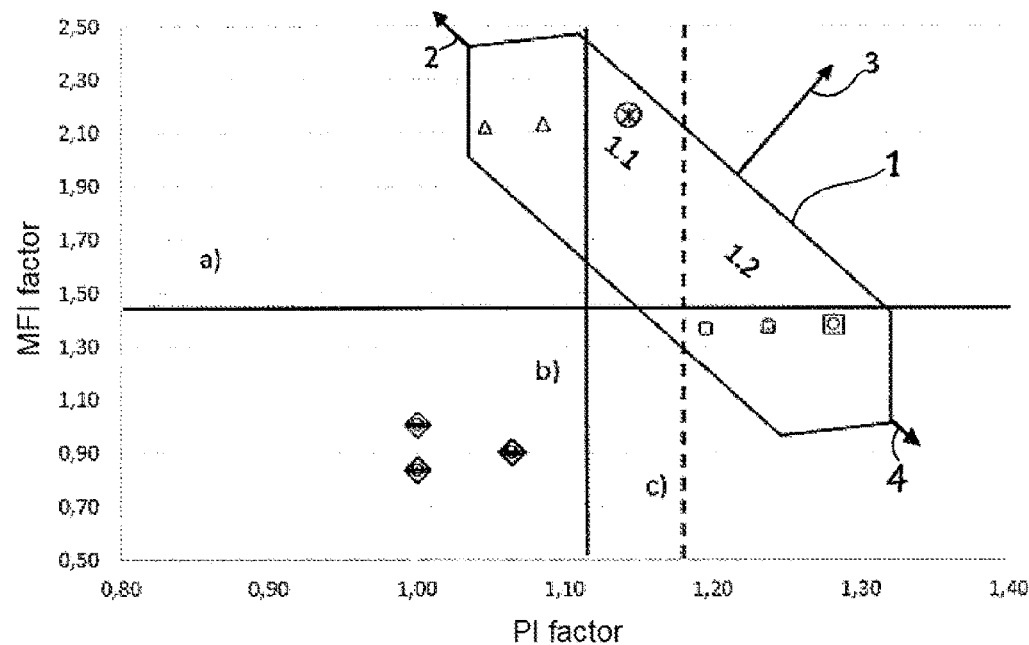

SPUNBONDED LAMINATE

FIELD OF THE INVENTION

The present invention relates to a spunbonded laminate. More particularly this invention concerns a method of making such a laminate.

BACKGROUND OF THE INVENTION

Such a laminate comprises at least two spunbonded nonwoven layer of which one has crimped continuous filaments or consists or substantially consists of crimped continuous filaments, and the crimped continuous filaments are multicomponent filaments, in particular bicomponent filaments. The invention further relates to a method of making a spunbonded nonwoven laminate. It lies within the scope of the invention that the continuous filaments comprise continuous filaments of thermoplastic material. Continuous filaments differ as a result of their quasi-endless length from staple fibers that have much shorter lengths of, for example, 10 mm to 60 mm.

Spunbonded nonwoven laminates of the type described previously and corresponding methods for making such spunbonded nonwoven laminates are known from the prior art and from practice in various embodiments. For many applications nonwovens or nonwoven laminates having a large thickness and the smallest possible surface density are required. A large thickness is usually achieved by using crimped or corrugated filaments (crimped filaments). In this case, spiral crimped filaments (spiral or helical crimp) are preferred. Multicomponent filaments or bicomponent filaments are used to produce crimped filaments. In order to produce a crimping, it is sufficient if both components of bicomponent filaments differ in terms of the width of the molar mass distribution. Other differences (viscosity, melting point, generally different solidification processes) or combinations thereof also result in a crimping. Frequently the attainable maximum crimping for a certain formulation can only be used in slow single-beam methods to produce a spunbonded nonwoven in all forms. In the multibeam method for the continuous production of a plurality of spunbonded nonwoven layers this crimping is frequently too strong and this results in an undesired inhomogeneous deposition or a deposition with undesired reduced dimensional stability. When a compromise between high thickness and satisfactory filament deposition has hitherto been sought in multibeam systems, this was usually at the expense of the thickness. In three-beam systems and therefore corresponding triple production speed, a reduction to half or two thirds the thickness of a single layer is not unusual to produce nonwoven laminates having masses per unit area between 20 and 25 g/m². In multibeam systems the quality of the deposition could be improved by finer filaments. The mixtures known from the prior art however typically show a reduction in the nonwoven thickness in the case of finer filaments (more chamber pressure in the cooling chamber, more stretching air during stretching, lower throughput). The advantages of a better deposition and productivity cannot therefore be combined with a high thickness here.

Fine fiber nonwovens are known from the European Patent EP 3 521 495 [U.S. Pat. No. 11,091,861] of the applicant. These fine fiber nonwovens have a good coverage and a high-quality deposition and are characterized by a soft homogeneous surface. In multibeam applications however, the thickness leaves something to be desired.

In order to produce a sufficient crimp and a high thickness, in particular multicomponent filaments or bicomponent filaments having a side-by-side configuration or having an eccentric core-sheath configuration are used. The provision of a high thickness is usually associated with a relatively high surface density of the nonwoven. This applies on the one hand to single-layer nonwovens but in particular for multibeam nonwovens produced in multibeam systems. The production of multiple layers means that layers must one the one hand be compacted or pre-consolidated more strongly in each case in order not to damage the deposition of these layers when running through the subsequent beams but also that first layers must additionally be further compacted when depositing the next layers and thus the thickness of the spunbonded nonwoven laminate is also significantly reduced compared with good thicknesses that can be achieved accordingly in individual layers. In particular in multibeam systems of, for example, three or more beams, there is thus a conflict of aims with a view to achieving a high thickness with low surface density at the same time and the solution of this conflict of aims has so far presented the person skilled in the art with insoluble problems. So far the achievement of a target nonwoven thickness has usually resulted in a disproportionate increase in the surface density of the nonwoven layer or the nonwoven laminate or in a thick laminate having inhomogeneous deposition. This also results in an undesirably high use of materials and therefore in high costs.

Therefore a high thickness with the lowest possible surface density is desirable. In this case, it should also be borne in mind that such a spunbonded nonwoven laminate must also fulfil the requirements in relation to softness, strength and in particular dimensional stability. A sufficient strength and in particular a sufficient dimensional stability are necessary for the further processing. In the laminates known from the prior art the desired properties are achieved by reinforcing layers, for example, nonwoven layers without crimping or nonwoven layers with reduced crimping or by the combination of a stable fine fiber nonwoven layer (e.g. with filaments having a titer below 1.5 denier) with a denser network and medium crimping with thicker nonwoven layers using fibers having a normal titer (for example, 1.7 to 2 denier) and with larger crimp. In this case, however, the surface density of the laminate is relatively high.

OBJECTS OF THE INVENTION

It is therefore an object of the present invention to provide an improved spunbonded laminate and method of making same.

Another object is the provision of such an improved spunbonded laminate and method of making same that overcomes the above-given disadvantages, in particular that makes the spunbonded nonwoven laminate of the above-described type that, with substantially constant material usage, has a higher thickness compared to the nonwovens known from practice or from the prior art, in particular when also produced in multibeam systems, and at the same time also has an optimal softness, a high strength and in particular a high dimensional stability.

Another object of the invention is to provide a method of making such a spunbonded nonwoven laminate.

SUMMARY OF THE INVENTION

A laminate has according to the invention first and second spunbonded nonwoven layers at least one of which comprises or consists essentially of crimped continuous filaments that are bicomponent filaments having a first component based on polypropylene and a second component based on polypropylene, a specific density ρ (g/cm³) of the spunbonded nonwoven laminate depending on the surface density of the spunbonded nonwoven laminate lying below a density limit $\rho_G$ defined by the following equation $$\rho_G = 9 \text{ cm}^{-1} \times \text{surface density g/cm}^2 + 0.0393 \text{ g/cm}^3.$$

The specific density limit $\rho_G$ is thus linearly dependent on the surface density of the spunbonded nonwoven laminate.

A spunbonded nonwoven laminate according to the invention can consist of only two spunbonded nonwoven layers, wherein at least one of these spunbonded nonwoven layers comprises crimped continuous filaments. However, it also lies within the framework of the invention that a spunbonded nonwoven laminate according to the invention comprises more layers or nonwoven layers and, for example, comprises two or more spunbonded nonwoven layers with crimped continuous filaments and/or comprises two or more spunbonded nonwoven layers with filaments without or with little crimping. It is essential within the scope of the invention that at least two spunbonded nonwoven layers are present in the laminate of which at least one spunbonded nonwoven layer comprises crimp continuous filaments.

A very recommended embodiment of the invention is characterized in that the first component of the multicomponent filaments or bicomponent filaments consists or substantially consists of a polypropylene mixture or consists or substantially consists of a polypropylene copolymer (CoPP). The expression "substantially consists" means in particular that the first component consists of at least 90 wt. %, preferably at least 95 wt. % and more preferably at least 98 wt. % of the polypropylene mixture or of the polypropylene copolymer. The statement "substantially consists" in particular takes into account the circumstance that in addition to the said substance, additives and the like can also be contained in the first component. These additives are in particular active substances such as dyes, softeners/lubricants, surface-active substances, nucleating agents or fillers such as chalk. The term "polypropylene mixture" means in particular the mixture of two or more homopolypropylenes or the mixture of at least one homopolypropylene with at least one polypropylene copolymer or the mixture of two or more polypropylene copolymers. Polypropylene copolymer means in particular also corresponding random copolymers.

It lies within the scope of the invention that the second component of the multicomponent filaments or bicomponent filaments consists or substantially consists of a polypropylene. The expression "substantially" means in particular that the second component consists of at least 90 wt. %, preferably of at least 95 wt. % and more preferably of at least 98 wt. % of the polypropylene. The fact that the second component consists or substantially consists of a polypropylene preferably means within the scope of the invention that the second component consists or substantially consists of a homopolypropylene or consists or substantially consists of a polypropylene copolymer. Fundamentally the second component could also consist or substantially consist of a polypropylene mixture, wherein then the definition given for the polypropylene mixture then applies in particular to the first component. Here again additives can also be present as in the first component, wherein type and fraction of the additives can differ between the components.

A particularly preferred embodiment of the invention is characterized in that the at least one spunbonded nonwoven layer with crimped continuous filaments comprises filaments having a titer of up to 2 denier, preferably having a titer of less than 2 denier, more preferably having a titer of less than 1.5 denier, particularly preferably of 1 to 1.7 denier and quite particularly preferably of 1.2 to 1.7 denier. The invention is in this respect based on the finding that the solution of the technical problem is achieved by a sufficient crimping of the filaments with finer filaments, wherein these finer filaments enable a stable network of deposition and therefore a three-dimensional product.

A very preferred embodiment of the invention is characterized in that the crimped continuous filaments of the at least one spunbonded nonwoven layer with crimped continuous filaments have a core-sheath configuration and particularly preferably an eccentric core-sheath configuration. In this case, expediently the first component of the multicomponent filaments or bicomponent filaments forms the sheath component and the second component forms the core component. However, it also lies within the scope of the invention that in the at least one spunbonded nonwoven layer with crimped continuous filaments, the filaments have a side-by-side configuration. In this case, one side of the filaments is formed by the first component and the other side is formed by the second component.

A very recommended embodiment of the invention is characterized in that at least 25% of all the filaments or continuous filaments of the laminate according to the invention are crimped continuous filaments having a core-sheath configuration, in particular having an eccentric core-sheath configuration. The preceding fraction of the filaments (fiber fraction) is expediently determined as follows: the spunbonded nonwoven laminate is cut over a length of at least 10 mm and an SEM image is made from the cut surface and evaluated. The fiber fraction of the type of filaments in question here corresponds to the number of the corresponding filaments in the field of view relative to all the filaments in the cut surface in the field of view.

It lies within the scope of the invention that in the crimped continuous filaments having an eccentric core-sheath configuration, the sheath of the filaments, when viewed in the filament cross-section, has a constant thickness D or a substantially constant thickness D over at least 20%, in particular over at least 25%, preferably over at least 30%, more preferably over at least 35% and particularly preferably over at least 40% of the filament circumference. Expediently the thickness of the sheath in the region of its constant or substantially constant thickness D is 0.1 to 4 μm, preferably 0.1 to 3 μm, more preferably 0.1 to 2 μm and very preferably 0.1 to 0.9 μm. It is recommended that the thickness D is at least 100 nm and that the thickness differs locally by up to a maximum of 400 nm, in particular up to a maximum of 300 nm, preferably up to a maximum of 200 nm from the average thickness in the constant thickness region or in the substantially constant thickness region.

A very preferred embodiment of the invention is characterized in that the laminate according to the invention comprises at least three spunbonded nonwoven layers, wherein at least one spunbonded nonwoven layer comprising crimped continuous filaments, in particular comprising crimped continuous filaments having an eccentric core-sheath configuration, is arranged on an outer side of the laminate and that preferably the titer of the continuous filaments of this spunbonded nonwoven layer is up to 2 denier, preferably less than 2 denier, particularly preferably less than 1.5 denier, in particular 1 to 1.7 denier and very preferably 1.2 to 1.7 denier.

A very recommended embodiment of the invention is characterized in that the spunbonded nonwoven layer according to the invention has a surface density in the range of 10 to 40 g/m², in particular in the range of 12 to 35 g/m², preferably in the range of 13 to 30 g/m², more preferably in the range of 14 to 25 g/m² and very preferably in the range of 15 to 22 g/m².

It lies within the scope of the invention that the first component of the multicomponent filaments or the bicomponent filaments comprises at least one polypropylene copolymer (CoPP) or a polypropylene copolymer, wherein this first component preferably has a fraction of the co-monomer of 1 to 7 wt. %, preferably of 1.5 to 5 wt. %. It has been shown that the softness of the laminate according to the invention can be improved by this embodiment. Preferably a corresponding spunbonded nonwoven layer with these crimped continuous filaments is disposed on an outer side or on a surface of the spunbonded nonwoven laminate according to the invention. In this case, the crimped continuous filaments of this spunbonded nonwoven layer on the surface of the laminate are preferably crimped continuous filaments having an eccentric core-sheath configuration and the aforesaid polypropylene copolymer is contained in the sheath component of the crimped continuous filaments.

A particularly recommended embodiment of the invention is characterized in that the first and the second component of the multicomponent filaments or bicomponent filaments have different melt-flow rates (MFI) and that in continuous filaments having a core-sheath configuration preferably the second component forming the core component has a higher melt-flow rate that the first component forming the sheath component. It lies within the scope of the invention that the ratio of the melt-flow rate of the second component, in particular of the core component, to the melt-flow rate of the first component, in particular the sheath component, is 0.9 to 2.2, preferably 1 to 2. The melt-flow rate is measured within the scope of the invention preferably in accordance with ISO 1133 in g/min under the conditions 230° C. and 2.16 kg.

A particularly well-proven embodiment of the invention is characterized in that the ratio of the polydispersity index (PI) of the first component, in particular of the sheath component, to the polydispersity index (PI) of the second component, in particular the core component, is 0.9 to 1.4, in particular 1 to 1.35. It is recommended that the first component, in particular the sheath component, has a broader molar mass distribution than the second component, in particular the core component. The polydispersity index in this case is the quotient of the weight average of the molar mass Mw and the number average of the molar mass Mn (PI=Mw/Mn). The average molar masses are in this case measured by gel permeation chromatography (GPC) and specifically preferably in accordance with ISO 16014-1: 2003, ISO 16014-2:2003, ISO 16014-4:2003 and ASTM D6474-12. The polydispersity index (PI=Mw/Mn) is typically measured for pure polymers. For the sake of simplicity it is assumed here that the polydispersity index of a polymer mixture is composed of the polydispersity index of the individual raw materials according to their fractions. The polydispersity index of a polymer mixture of polymers A and B is then calculated according to the following formula:

$$PI(\text{mixture } A+B) = \text{fraction } A \times PI(B) + \text{fraction } B \times PI(B)$$

A polymer mixture with 60% A and with 40% B then has a polydispersity index $PI(A+B) = 0.6 \times PI(A) + 0.4 \times PI(B)$.

According to a recommended embodiment of the invention, wherein the melting temperature of the first component, in particular of the sheath component, is lower than the melting temperature of the second component, in particular of the core component, and in this case the melting temperature difference is expediently 0 to 20° C., preferably 1 to 18° C. and more preferably 2 to 16° C. The invention is in this respect based on the finding that in this embodiment a reduced expenditure is obtained for the thermal consolidation of the nonwoven layers and/or nonwoven laminate since the sheath component melts more easily than the core component due to the lower melting temperature. It is recommended that the melting temperatures within the scope of the invention are measured by DSC (differential scanning calorimetry) in accordance with ISO 11357-3.

A preferred embodiment of the invention is characterized in that the second component or the second component used as the core component comprises at least one lubricant and preferably comprises at least 1000 ppm (relative to the total filament) of at least one lubricant. The invention is based on the finding that in this way the softness of the spunbonded nonwoven laminate can be improved, in particular if the relevant nonwoven layer is disposed on a surface or on an outer side of the laminate. By adding into the core component the contamination of the spunbonded nonwoven layer by evaporating lubricant is reduced.

In order to attain the object of the invention, the invention furthermore teaches a method of making a spunbonded nonwoven laminate comprising at least two spunbonded nonwoven layers, wherein at least one spunbonded nonwoven layer is produced with crimped continuous filaments, wherein the crimped continuous filaments are multicomponent filaments, in particular bicomponent filaments having a first component based on polypropylene and a second component based on polypropylene, wherein at least one spunbonded nonwoven layer is compacted or pre-consolidated by means of at least one hot roller and/or by means of at least one calender roller and/or by means of at least one hot air oven, wherein the spunbonded nonwoven laminate is finally consolidated by means of at least one calender roller and the laminate is produced subject to the condition that the specific density ρ in g/cm³ of the spunbonded nonwoven laminate depending on the surface density of the spunbonded nonwoven laminate lies below a density limit $\rho_G$ that is defined by the following equation:

$$\rho_G = 9 \text{ cm}^{-1} \times \text{Surface density g/cm}^2 + 0.0393 \text{ g/cm}^3.$$

It lies within the scope of the invention that the at least one spunbonded nonwoven layer with crimped continuous filaments is compacted or pre-consolidated in the manner described. Furthermore, it lies within the scope of the invention that at least two, preferably all the spunbonded nonwoven layers of the spunbonded nonwoven laminate according to the invention are each compacted or pre-consolidated in the said manner.

A particularly preferred embodiment of the method according to the invention is characterized in that the final consolidation is performed using at least one calender roller that has an "open dot" engraving. In this case, the "open dot" engraving is characterized by an embossing surface or pressing surface of 8 to 15%, in particular of 10 to 14% and preferably of 11 to 13%. It is recommended that the figure density of the calender roller for the final consolidation is less than 35 figures per cm², in particular less than 30 figures per cm² and is preferably 18 to 28 figures per cm² and more preferably 20 to 28 figures per cm². Expediently the area of a figure is 0.25 to 0.75 mm², in particular 0.3 to 0.7 mm², wherein compact figures (circles, diamonds or ellipses having a length/width ratio of less than 2) are preferred. It is recommended that the center point distance of two figures of the calender roller is between 0.9 and 2.5 mm, in particular between 1 and 2 mm. Preferably the engraving depth of the calender roller is 0.4 to 1.0 mm, in particular 0.5 to 0.9 mm.

It lies further within the scope of the invention that the coverage or opacity of the spunbonded nonwoven laminate according to the invention is improved by adding dye. For this purpose the dye is expediently metered uniformly into all layers of the laminate. It also lies within the scope of the invention that dye is only metered into special nonwoven layers. In this case, the dye is expediently metered into nonwoven layers having more uniform deposition so that the optical uniformity for a given dye component can be optimized. The dye can in particular be introduced into nonwoven layers with lower crimping of the filaments or into nonwoven layers without crimping of the filaments or also into nonwoven layers having a higher surface density. Fundamentally layers having finer filaments also come into question.

The definition according to the invention of the specific density $\rho$ of the spunbonded nonwoven laminate below the density limit $\rho_G$ relates to the manufacturing state of the spunbonded nonwoven laminate according to the invention. However, in the processing chain between its manufacture, further processing and packaging of the finished end product, the spunbonded nonwoven laminate will normally experience a compression acting on the spunbonded nonwoven laminate in the thickness direction. It lies within the scope of the invention that the laminate thickness is then only restored again up to a certain percentage. This percentage fraction of the thickness of the spunbonded nonwoven laminate that is not restored after the action of a compression compared with the original laminate thickness is designated as pressure deformation residue and constitutes a permanent deformation of the spunbonded nonwoven laminate. It lies within the scope of the invention that the spunbonded nonwoven laminate according to the invention has a maximum pressure deformation residue of 30%, in particular of 20% and preferably of 10% so that the specific density $\rho$ of the spunbonded nonwoven, in particular in the usage state of the end product, is a maximum of 30%, in particular a maximum of 20% and preferably a maximum of 10% above the density limit $\rho_G$.

Expediently, the pressure deformation residue of the laminate according to the invention is determined as follows: the spunbonded nonwoven laminate has an original thickness D1 that is measured at a pressure of 0.5 kPa. The spunbonded nonwoven laminate is then loaded or compressed over three days at 6 kPa and then stored for three days without loading. After this time, the thickness D2 is measured. The pressure deformation residue (DVR) is then calculated as follows: DVR=(D1−D2)/D1. The measurement is repeated for at least five samples and then the average is determined as DVR.

Preferably the density $\rho$ of a spunbonded nonwoven laminate according to the invention is determined as follows: the fraction of air between the filaments of the laminate is neglected. The density is then obtained from the quotient of the surface density of the laminate/thickness of the laminate. The density of a spunbonded nonwoven having a surface density of 50 g/m$^2$ and 0.2 mm thickness is then therefore 50/0.2=0.25 g/cm$^3$.

It lies within the scope of the invention that the spunbonded nonwovens used in the spunbonded nonwoven laminate according to the invention and in particular the at least one spunbonded nonwoven layer with crimped continuous filaments is produced by a spunbond method. Hereinafter, a preferred spunbond method for the spunbonded nonwovens of the spunbonded nonwoven laminate according to the invention is described. The continuous filaments for a spunbonded nonwoven or for a spunbonded nonwoven layer are spun by means of a spinning nozzle or spinneret and then cooled in a cooler with a cooling chamber. It lies within the scope of the invention that a monomer extraction device is disposed between the spinning nozzle and the cooler, by means of which perturbing gases produced during the spinning process can be removed from the device. After passing through the cooler, the filaments are expediently guided through a stretcher for elongating the continuous filaments. It is recommended that the stretcher has an intermediate passage that connects the cooler to a stretching shaft of the stretcher. According to a particularly preferred embodiment of the invention, the unit comprising the cooler and the stretcher or the unit comprising the cooler, the intermediate passage and the stretching shaft is configured as a closed unit and apart from the supply of cooling air in the cooler, there is no further supply of air from outside into this unit.

Preferably in the filament flow direction, the stretcher is followed by at least one diffuser through which the continuous filaments are guided. Expediently, after passing through the at least one diffuser, the continuous filaments are deposited on a depositing device that is preferably configured as a depositing foraminous belt. It is recommended that the depositing foraminous belt is a continuously circulated depositing foraminous belt. Expediently the depositing foraminous belt is configured to be air-permeable so that process air can be sucked from below through the depositing foraminous belt. Expediently at least one extraction device is provided for the extraction of the process air under the depositing foraminous belt.

The invention is based on the finding that in a spunbonded nonwoven laminate according to the invention, a high thickness and a high softness can be achieved with nevertheless sufficiently high strength and dimensional stability of the laminate. In addition, the filament deposition is characterized by a satisfactory quality and a sufficient homogeneity. With the method according to the invention, a higher thickness and a higher softness can be achieved compared to methods known from the prior art with almost the same material usage, wherein the laminates are sufficiently strong and dimensionally stable. It should be emphasized that the advantages according to the invention can be achieved by relatively simple measures and therefore with relatively low costs.

Embodiments

Plastics or polymers used in the following embodiments are specified in detail in the following Table 1. Here the individual polymers are characterized by the letters A to G that are used in the embodiments. In addition to the name of the manufacturer and the type of polymer, the melt-flow rate MFR of the polymer in g/10 min is given in the fourth column and the melting point TM in degrees Celsius is given in the fifth column. The number average of the molar mass Mn is given in the sixth column and the mass average of the molar mass Mw is given in the seventh column. The eighth column relates to the centrifuge average of the molar mass Mz and the ninth column gives the polydispersity index PI=Mw/Mn. The quotient Mw/Mz of the average molar mass is found in the last column. The polymers A to G are used in the following embodiments.

TABLE 1

| Polymer | Name of manufacture | Type | MFR g/10 min | TM °C. | Mn | Mw | Mz | Mw/Mn (PI) | Mw/Mz |
|---|---|---|---|---|---|---|---|---|---|
| A | Moplen HP562T | Homopolypropylene | 55 | 160 | 28000 | 152200 | 320100 | 5.4 | 2.1 |
| B | Exxon PP3155E5 | Homopolypropylene | 35 | 159 | 30150 | 148500 | 307500 | 4.93 | 2.07 |
| C | Borealis HG475FB | Homopolypropylene | 27 | 158 | 35800 | 166000 | 344000 | 4.6 | 2.07 |
| D | Moplen RP248R | Polypropylene-Copolymer | 30 | 144 | 33600 | 152500 | 308000 | 4.54 | 2.02 |
| E | Moplen RP3386 | Polypropylene-Copolymer | 30 | 144 | 33600 | 152500 | 308000 | 4.54 | 2.02 |
| F | Moplen RP348R | Polypropylene-Copolymer | 25 | 148 | 28900 | 194750 | 569000 | 6.7 | 2.9 |
| G | Sabic PP511A | Homopolypropylene | 25 | 161 | 36500 | 163500 | 340500 | 4.9 | 2.08 |

The following Tables 2 to 4 relate to bicomponent filaments suitable for the invention with the two components 1 and 2 based on polypropylene. The abbreviation PP here means a homopolypropylene and the abbreviation CoPP means a polypropylene copolymer. When different numbers (1, 2 or 3) are appended, this characterizes the fact that different homopolypropylenes or different polypropylene copolymers are involved. PP1 and PP2 are therefore, for example, two different homopolypropylenes. The homopolypropylenes and polypropylene copolymers were selected from the above Table 1.

For the assignment of the two components 1 and 2 of the bicomponent filaments in the following Tables 2 to 4 the following should be noted: in combinations of homopolypropylenes for components 1 and 2, the component having the narrower molecular weight distribution (or having the lower polydispersity index PI) is component 1. In combinations of homopolypropylene with polypropylene copolymers (CoPP), the homopolypropylene is component 1 and the propylene copolymer is component 2. In the case of combinations of polypropylene copolymers (CoPP/CoPP), component 2 is the component having the broader molecular weight distribution (having the higher polydispersity index PI).

Bicomponent filaments with side-by-side configuration (S/S):

The bicomponent filaments of Table 2 with an A/S configuration have a standard titer of 1.5 to 2.0 denier. For components 1 and 2 the third column here gives the quotient of the melt-flow rate of component 1 by the melt-flow rate of component 1. The fourth column gives the quotient of the polydispersity index PI of component 2 to the polydispersity index PI of component 1. The fifth column gives the absolute difference between the melting temperature of component 1 and the melting temperature of component 2.

TABLE 2

| Component | | MFR | PI | ΔTm |
|---|---|---|---|---|
| 1 | 2 | 1/2 | 2/1 | 1-2 |
| PP1 | PP1 + PP2 | 1.2-1.4 | 1.1-1.3 | <5° C. |
| PP1 | PP2 + PP3 | 1.2-1.4 | 1.1-1.3 | <5° C. |
| PP1 | CoPP1 | | | |
| CoPP1 + CoPP2 | 0.9-1.2 | 1.1-1.3 | 10-15° C. | |
| PP1 | CoPP1 + PP1/ | | | |
| CoPP1 + PP2 | 1.0-1.2 | 1.1-1.3 | 5-15° C. | |

Bicomponent filaments having an eccentric core-sheath configuration (eC/S):

The following Table 3 gives mixtures and parameters for bicomponent filaments according to the invention with an eC/S configuration having a standard titer greater than 1.5 denier.

TABLE 3

| Component | | MFR | PI | ΔTm |
|---|---|---|---|---|
| 1 | 2 | 1/2 | 2/1 | 1-2 |
| PP1 | PP1 + PP2 | 0.9-1.5 | 1.1-1.4 | <5° C. |
| PP1 | PP2 + PP3 | 0.9-1.5 | 1.1-1.4 | |
| PP1 | CoPP1 | 0.9-1.5 | 1.1-1.4 | 10-15° C. |
| PP1 | CoPP1 + PP1 | 0.9-1.5 | 1.2-1.4 | 5-10° C. |
| PP1 | CoPP1 + PP2 | 0.9-1.5 | 1.2-1.4 | 5-10° C. |
| PP1 | CoPP1 + CoPP2 | 0.9-1.5 | 1.2-1.4 | 10-15° C. |

The following Table 4 relates to bicomponent filaments according to the invention with an eccentric core-sheath configuration having a fine titer less than 1.5 denier.

TABLE 4

| Component | | MFR | PI | ΔTm |
|---|---|---|---|---|
| 1 | 2 | 1/2 | 2/1 | 1-2 |
| PP1 | CoPP1 + PP2 | 1.5-2.2 | 1-1.2 | 5-10° C. |
| PP1 | CoPP1 | 1.5-2.2 | 1-1.2 | 5-15° C. |
| PP1 | CoPP1 + CoPP2 | 1.5-2.2 | 1-1.2 | 5-15° C. |
| PP1 | PP1 + PP2 | 1.5-2.2 | 1-1.2 | 0-5° C. |

The raw materials and the parameters or settings for making three-layer spunbonded nonwoven laminates are given in the following Tables 5 and 6. In this case, each laminate is produced using a three-beam system with the beams 1, 2 and 3. Preferably each beam corresponds to a device shown in FIG. 1 for making spunbonded nonwovens. Almost all the nonwoven layers of the three-layer spunbonded nonwoven laminate comprise crimped bicomponent filaments with the components 1 and 2. Only the middle or second nonwoven layer of samples 5 and 12 comprises monocomponent filaments. In each case, the raw material combinations or polymer combinations are given in the second line of the following tables. The raw materials A to G can be found in Table 1. The mass ratio of the two components with respect to one another for the samples is given in the third line of the following tables. The fourth line specifies the cabin pressure in the cooling chamber of the spunbond nonwoven device used in each case for the spunbonded nonwoven layer. The last line gives the polymer throughput for the samples in the system in kg/h/m. Spinning nozzles having 6,800 capillaries/m were used in each case to produce the nonwoven layers or the corresponding filaments. The three-layer laminates were finally consolidated in each case using a calender roller with an "open dot" engraving.

Eight laminate samples of three-layer spunbonded nonwoven laminates according to the prior art are specified in Table 5. Each layer of the three-layer laminate samples 1 to 4 comprises crimped bicomponent filaments in a side-by-side configuration and specifically with a titer of 1.2 denier. In these samples 1 to 4 the polymer of each component of the bicomponent filaments was provided with 5 wt. % spinning aid. A Ziegler-Natta homopolypropylene having a melt-flow rate of 1,200 g/10 min and a melting temperature of 158° C. was used here as spinning aid.

The laminate samples 5 to 8 comprise filaments having a titer of 1.7 denier. Almost all the layers comprise crimped bicomponent filaments with side-by-side configuration. Only the second or middle layer of sample 5 comprises monocomponent filaments without crimping and the first layer of sample 8 comprises bicomponent filaments with a core-sheath configuration without crimping.

TABLE 5

|  | Beam 1 | 2 | 3 |
|---|---|---|---|
| Sample: 1 | | | |
| Raw materials | G/D | G/D | G/D |
| Mass ratio | 70:30 | 50:50 | 60:40 |
| Cabin pressure | 5800 | 6200 | 5600 |
| Throughput kg/h/m | 150 | 150 | 150 |
| Sample: 2 | | | |
| Raw materials | C/E | C/E | C/E |
| Mass ratio | 50:50 | 50:50 | 50:50 |
| Cabin pressure | 6500 | 6500 | 6500 |
| Throughput kg/h/m | 155 | 155 | 155 |
| Sample: 3 | | | |
| Raw materials | C/E | C/E | C/E |
| Mass ratio | 50:50 | 50:50 | 50:50 |
| Cabin pressure | 6500 | 6500 | 6500 |
| Throughput kg/h/m | 155 | 155 | 155 |
| Sample: 4 | | | |
| Raw materials | C/E | C/E | C/E |
| Mass ratio | 50:50 | 50:50 | 50:50 |
| Cabin pressure | 6500 | 6500 | 6500 |
| Throughput kg/h/m | 155 | 155 | 155 |
| Sample: 5 | | | |
| Raw materials | C/D | | C/D |
| Mass ratio | 80:20 | Mono - no crimping | 70:30 |
| Cabin pressure | 3800 | 4200 | 3800 |
| Throughput kg/h/m | 200 | 200 | 200 |
| Sample: 6 | | | |
| Raw materials | G/D | G/D | G/D |
| Mass ratio | 90:10 | 60:40 | 50:50 |
| Cabin pressure | 4000 | 4000 | 3800 |
| Throughput kg/h/m | 205 | 205 | 205 |
| Sample: 7 | | | |
| Raw materials | C/D | C/D | C/D |
| Mass ratio | 70:30 | 60:40 | 50:50 |
| Cabin pressure | 4500 | 4500 | 4000 |
| Throughput kg/h/m | 250 | 250 | 250 |
| Sample: 8 | | | |
| Raw materials | G/D | G/D | G/D |
| Mass ratio | 70:30 no crimping | 70:30 | 70:30 |
| Cabin pressure | 3800 | 4000 | 3800 |
| Throughput kg/h/m | 200 | 200 | 200 |

Four laminate samples according to the invention (sample 9 to sample 12) of three-layer spunbonded nonwoven laminates are specified in the following Table 6. Each layer of the three-layer spunbonded nonwoven laminates comprises crimped bicomponent filaments in an eccentric core-sheath configuration. Only the middle or second layer of sample 12 comprises monocomponent filaments without crimping. The filaments of samples 9 and 10 have a titer of 1.7 denier, the filaments of sample 11 have a titer of 1.35 denier and the filaments of sample 12 have a titer of 1.3 denier. In the case of the raw materials given in the second line, the first raw material specified is the core component and the raw material mixture specified thereafter is the sheath component of the bicomponent filaments. The mass ratio given in the third line in each case relates to the core/sheath mass ratio. The mass ratio specified in the fourth line relates to the mass ratio of the components of the polymer mixture in the sheath component.

TABLE 6

|  | Beam 1 | 2 | 3 |
|---|---|---|---|
| Sample: 9 | | | |
| Raw materials | B/D + C | B/D + C | B/D + C |
| Mass ratio | 85:15 | 80:20 | 70:30 |
| Mass ratio D:C | 70:30 | 80:20 | 80:20 |
| Cabin pressure | 4000 | 4000 | 3800 |
| Throughput kg/h/m | 215 | 215 | 215 |
| Sample: 10 | | | |
| Raw materials | B/D + C | B/D + C | B/D + C |
| Mass ratio | 90:10 | 85:15 | 80:20 |
| Mass ratio D:C | 60:40 | 70:30 | 80:20 |
| Cabin pressure | 4000 | 4000 | 3800 |
| Throughput kg/h/m | 215 | 215 | 215 |
| Sample: 11 | | | |
| Raw materials | A/D + C | A/D + C | A/D + C |
| Mass ratio | 90:10 | 70:30 | 70:30 |
| Mass ratio D:C | 60:40 | 75:25 | 75:25 |
| Cabin pressure | 4000 | 5800 | 5500 |
| Throughput kg/h/m | 200 | 200 | 200 |
| Sample: 12 | | | |
| Raw materials | A/D + C | Only A | A/D + C |
| Mass ratio | 70:30 | | 70:30 |
| Mass ratio D:C | 50:50 | | 75:25 |
| Cabin pressure | 5500 | 5800 | 5500 |
| Throughput kg/h/m | 200 | 200 | 200 |

The following Table 7 combines the essential parameters for the nonwoven laminates of all samples 1 to 12, wherein, as already stated above, samples 1 to 8 comprise samples produced according to the prior art and samples 9 to 12 comprise samples produced according to the teaching according to the invention. The weight per unit area of the nonwoven laminates is given in the second column and the linear speed or production speed is given in the third column. The fourth column gives the density of the nonwoven laminates in $g/cm^3$. The last column gives the titer of the filaments of the laminates in denier.

TABLE 7

| Sample | Weight per unit area (g/m²) | Linear speed (m/min) | Density (g/cm³) | Titer (denier) |
|---|---|---|---|---|
| 1 | 25 | 345 | 0.071 | 1.2 |
| 2 | 16.3 | 508 | 0.065 | 1.2 |
| 3 | 18.4 | 450 | 0.068 | 1.2 |
| 4 | 25.5 | 325 | 0.077 | 1.2 |
| 5 | 24.6 | 402 | 0.065 | 1.7 |
| 6 | 14.1 | 735 | 0.052 | 1.7 |
| 7 | 20.3 | 590 | 0.06 | 1.7 |
| 8 | 12.9 | 830 | 0.056 | 1.7 |
| 9 | 23.5 | 450 | 0.053 | 1.7 |
| 10 | 20 | 550 | 0.057 | 1.7 |
| 11 | 20.3 | 500 | 0.053 | 1.35 |
| 12 | 17 | 590 | 0.047 | 1.3 |

FIG. 3 shows a diagram for samples 1 to 12 in which the density (g/cm³) of the entire spunbonded nonwoven laminate is plotted as a function of the surface density (g/m²) of the entire laminate. Samples 1 to 8 relating to the prior art show measurement points above the straight line according to the invention that symbolizes the density limit $\rho_G$. The parameter values of samples 9 to 12 according to the invention lie below the straight line or below the density limit. These spunbonded nonwoven laminates are characterized by the advantages according to the invention that will be explained hereinafter.

The following Table 8 gives the quotient of the melt-flow rate of component 1 to component 2 as well as the quotient of the polydispersity index of component 2 to component 1 for the first nonwoven layer of the nonwoven laminate according to samples 1 to 12.

TABLE 8

| Sample | PI-Quotient 2/1 | MFI-Quotient 1/2 |
|---|---|---|
| 1 | 1.0 | 0.83 |
| 2 | 1.07 | 0.9 |
| 3 | 1.07 | 0.9 |
| 4 | 1.07 | 0.9 |
| 5 | 1.07 | 0.9 |
| 6 | 1.0 | 0.83 |
| 7 | 1.07 | 0.9 |
| 8 | No crimping | No crimping |
| 9 | 1.24 | 1.37 |
| 10 | 1.2 | 1.36 |
| 11 | 1.09 | 2.13 |
| 12 | 1.05 | 2.12 |

The following Table 9 gives the quotient of the melt-flow rate of component 1 to component 2 as well as the quotient of the polydispersity index of component 2 to component 1 for the three nonwoven layers of the nonwoven laminate according to samples 1 to 12.

TABLE 9

| Sample | Weight per unit area (g/m²) | Linear speed (m/min) | Density (g/cm³) | PI-2/1 Quotient 2/1 | MFI-Quotient 1/2 |
|---|---|---|---|---|---|
| 1 | 25 | 345 | 0.071 | 1/1/1 | 0.83/0.83/0.83 |
| 2 | 16.3 | 508 | 0.065 | 1.07/1.07/1.07 | 0.9/0.9/0.9 |
| 3 | 18.4 | 450 | 0.068 | 1.07/1.07/1.07 | 0.9/0.9/0.9 |
| 4 | 25.5 | 325 | 0.077 | 1.07/1.07/1.07 | 0.9/0.9/0.9 |
| 5 | 24.6 | 402 | 0.065 | 1.07/no crimping/1.07 | 0.9 no crimping/0.9 |
| 6 | 14.1 | 735 | 0.052 | 1/1/1 | 0.83/0.83/0.83 |
| 7 | 20.3 | 590 | 0.06 | 1.07/1.07/1.07 | 0.9/0.9/0.9 |
| 8 | 12.9 | 830 | 0.056 | no crimping/1/1 | No crimping/0.83/0.83 |
| 9 | 23.5 | 450 | 0.053 | 1.24/1.28/1.28 | 1.37/1.38/1.38 |
| 10 | 20 | 550 | 0.057 | 1.2/1.24/1.28 | 1.36/1.37/1.38 |
| 11 | 20.3 | 500 | 0.053 | 1.09/1.14/1.14 | 2.13/2.16/2.16 |
| 12 | 17 | 590 | 0.047 | 1.05/no crimping/1.14 | 2.12/no crimping/2.16 |

In FIG. 4 relating to Tables 8 and 9 the quotient of the melt-flow rate of component 1 to the melt-flow rate of component 2 is plotted versus the quotient of the polydispersity index of component 2 and the polydispersity index of component 1 for the raw materials of the spunbonded nonwoven laminate or the nonwoven layers. In this case in the diagram the parameter points in the framed area correspond to the bicomponent filaments according to the invention (samples 9 to 12). The parameter points on the left below the horizontal straight line correspond on the other hand to bicomponent filaments according to the prior art (samples 1 to 8). In the prior art it is assumed that for MFR quotients above the horizontal line the spinning stability becomes increasing poorer. Furthermore, it is assumed for the first layer thereof that for the quotient of the polydispersity index to the right of the vertical continuous line b) thick nonwoven layers can be achieved by relatively strong crimping in which case the degree of crimping and the dimensional stability and therefore also the machinability can be endangered. For the following beams 2 and 3 the region in which too strong crimping can endanger the deposition quality begins to the right of the vertical dashed line c) in FIG. 4.

In the framed region according to the invention on the other hand, fine filaments with a good crimping can be spun with good spinning stability that enable a spunbonded nonwoven laminate with improved thickness and density according to the invention to be deposited. The invention is based on the finding that in particular region 1.1 is to be preferred compared with region 1.2 since finer filaments with good density of the laminate can be achieved there more easily (see also diagram according to FIG. 3).

In the direction 2 characterized in the diagram in FIG. 4, a gradual deterioration in the spinning stability is observed due to too-low viscosities (too-low molecular weights of the polypropylene) and therefore a deterioration in the strengths of the nonwoven laminates. In the direction 3 characterized in the diagram according to FIG. 4, the spinning stability is lost due to the combination of two-wide molar mass distributions and too-large viscosity differences and therefore no fine filaments or no filaments with small titers are possible. Finally in the direction 4 characterized in the diagram according to FIG. 4 no fine filaments can be spun although higher densities can be achieved due to the larger quotients of the polydispersity index. Due to the relatively strong crimping, non-uniform and sensitive filament depositions are produced. Filaments having too high crimping are always at risk of being displaced due to horizontal air movements. Due to the relatively high titer values this effect is particularly defined here and not controllable. The region 1.1 according to the invention having lower titer values and a more stable network of filament deposition contrasts with this.

BRIEF DESCRIPTION OF THE DRAWING

The above and other objects, features, and advantages will become more readily apparent from the following description, reference being made to the accompanying drawing in which:

FIG. 1 is a vertical section through a device for making a spunbonded nonwoven layer of a spunbonded nonwoven laminate according to the invention, FIG. 2 is a cross-section through a preferred continuous filament with eccentric core-sheath configuration and FIG. 3 is a diagram of density versus surface density, FIG. 4 is the diagram of the melt-flow rate quotient versus the polydispersity index quotient.

SPECIFIC DESCRIPTION OF THE INVENTION

FIG. 1 shows a system for making a spunbonded nonwoven layer for the spunbonded nonwoven laminate according to the invention according to the spunbond method. Using this device or using this method preferably also the at least one spunbonded nonwoven layer with crimped continuous filaments is produced for the spunbonded nonwoven laminate. The device comprises a spinneret 1 for spinning continuous filaments 2 for a spunbonded nonwoven layer of the spunbonded nonwoven laminate according to the invention. The continuous filaments 2 spun by the spinneret 1 are introduced into a cooler with a cooling chamber 4. Preferably and in the embodiment air supply cabins 5, 6 arranged one above the other are arranged on two opposite sides of the cooling chamber 4. Expediently air at different temperature is introduced into the cooling chamber 4 from the air supply cabins 5, 6 arranged one above the other. Preferably and in the embodiment, a monomer extraction device 7 is arranged between the spinneret 1 and the cooler 3. With this monomer extraction device 7 perturbing gases produced during the spinning process can be removed from the device.

It is recommended that and in the embodiment a stretcher 8 for elongating the continuous filaments 2 is located downstream of the cooler 3 in the filament flow direction. Expediently and in the embodiment the stretcher 8 comprises an intermediate passage 9 that connects the cooler 3 to a stretching shaft 10 of the stretcher 8. Preferably and in the embodiment the unit comprising the cooler 3 and the stretcher 8 or the unit comprising the cooler 3, the intermediate passage 9 and the stretching shaft 10 is configured as a closed unit and apart from the supply of cooling air in the cooler 3, no further air is supplied from outside into this unit.

Expediently and in the experimental embodiment, in the filament flow direction the stretcher 8 is adjoined by a diffuser 11 through which the continuous filaments 2 are guided. After running through the diffuser 11, preferably and in the embodiment the continuous filaments 2 are deposited on a depositing device configured as a depositing foraminous belt 12. The depositing foraminous belt 12 is expediently and in the embodiment configured as a continuously circulating depositing foraminous belt 12. It lies within the scope of the invention that the depositing foraminous belt 12 is air-permeable so that it is possible to extract process air from below through the depositing foraminous belt 12. To this end, expediently and in the embodiment an extraction device 13 is disposed below the depositing foraminous belt 12.

FIG. 2 shows a section through a continuous filament 2 with an eccentric core-sheath configuration. Such continuous filaments 2 are preferably used for a spunbonded nonwoven layer with crimped continuous filaments in the spunbonded nonwoven laminate according to the invention. These comprise a bicomponent filament having a first component based on polypropylene in the sheath 14 and having a second component based on polypropylene in the core 15. It can be seen in FIG. 2 that in the preferred continuous filaments 2 the sheath 14 of the filaments 2 in the filament cross-section preferably and in the embodiment has a constant thickness D over more than 50% of the filament circumference. Preferably and in the embodiment the core 15 of the filaments 2, when viewed in the filament cross-section, is configured to be circular-segment-shaped. The sheath 14 in its region of constant thickness D preferably has a thickness D of 0.1 to 0.9 μm.

We claim:

1. A laminate comprising first and second spunbonded nonwoven layers wherein at least one spunbonded nonwoven layer comprises or consists essentially of crimped continuous filaments that are bicomponent filaments of core-sheath configuration and having a first component based on polypropylene and a second component based on polypropylene, a specific density $\rho$ in g/cm$^3$ of the spunbonded nonwoven laminate depending on the surface density of the spunbonded nonwoven laminate lying below a density limit $\rho_G$ defined by the following equation:

$$\rho_G = 9 \text{ cm}^{-1} \times \text{surface density g/cm}^2 + 0.0393 \text{ g/cm}^3.$$

2. The laminate according to claim 1, wherein the first component consists or substantially consists of a polypropylene mixture or consists or substantially consists of a polypropylene copolymer.

3. The laminate according to claim 1, wherein the second component consists or substantially consists of a polypropylene.

4. The laminate according to claim 1, wherein at least one spunbonded nonwoven layer of the laminate comprises crimped continuous filaments having a titer of up to 2 denier.

5. The laminate according to claim 1, wherein the first component is the sheath and the second component is the core.

6. The laminate according to claim 1, wherein at least 25% of all the continuous filaments of the laminate are crimped continuous filaments having an eccentric core-sheath configuration.

7. The laminate according to claim 6, wherein, in the crimped continuous filaments having an eccentric core-sheath configuration, the sheath of the filaments has a constant thickness D or a substantially constant cross-sectional thickness D over at least 20% of the filament circumference and a thickness of the sheath in the region of its constant or substantially constant thickness D is 0.1 to 4 μm.

8. The laminate according to claim 1, wherein the laminate further comprises a third spunbonded nonwoven layer lying on an outer side of the laminate, at least one of the spunbonded nonwoven layers comprising crimped continuous filaments having an eccentric core-sheath configuration and including continuous filaments of a titer up to 2 denier.

9. The laminate according to claim 1, wherein at least one of the spunbonded nonwoven layer comprises crimped continuous filaments with side-by-side configuration.

10. The laminate according to claim 1, wherein the laminate has a surface density of 10 to 40 g/m$^2$.

11. The laminate according to claim 1, wherein the first component comprises at least one polypropylene copolymer that has a fraction of the co-monomer of 1 to 6 wt. %.

12. The laminate according to claim 1, wherein the first and the second component have different melt-flow rates and the continuous filaments have a core-sheath configuration and the second component forms the core component and has a higher melt-flow rate than the first component forming the sheath component.

13. The laminate according to claim 1, wherein a ratio of the melt-flow rate of the second component to the melt-flow rate of the first component is 0.9 to 2.2.

14. The laminate according to claim 1, wherein a ratio of a polydispersity index of the first component to a polydispersity index of the second component is 0.9 to 1.4.

15. The laminate according to claim 1, wherein a melting temperature of the first component is lower than a melting temperature of the second component and a difference between the melting temperatures is 0 to 20° C.

16. The laminate according to claim 1, wherein the second component comprises at least 1000 ppm relative to the total filament of at least one lubricant.

\* \* \* \* \*